United States Patent [19]
Belden

[11] Patent Number: 5,295,793
[45] Date of Patent: Mar. 22, 1994

[54] WIND TURBINE
[75] Inventor: Ralph A. Belden, Melville, Australia
[73] Assignee: Telect, Inc., Liberty Lake, Wash.
[21] Appl. No.: 844,488
[22] Filed: Mar. 2, 1992
[51] Int. Cl.[5] .................................. F03D 7/00
[52] U.S. Cl. .......................... 416/13; 416/10
[58] Field of Search ............ 416/9, 10, 11, 13, 16, 416/102, 41, 142, 148

[56] References Cited
U.S. PATENT DOCUMENTS

| 2,026,828 | 1/1936 | Dunn | 416/10 |
|---|---|---|---|
| 2,178,047 | 10/1939 | Malme | 416/10 |
| 4,435,646 | 3/1984 | Coleman et al. | 416/102 |
| 4,449,889 | 5/1984 | Belden | 416/10 |
| 4,767,939 | 8/1988 | Calley | 416/10 |
| 4,773,824 | 10/1988 | Kiss | 416/10 |

FOREIGN PATENT DOCUMENTS

| 3201199 | 7/1983 | Fed. Rep. of Germany | 416/11 |
|---|---|---|---|
| 0948645 | 8/1949 | France | 416/10 |
| 0120788 | 7/1984 | Japan | 416/10 |

Primary Examiner—Edward K. Look
Assistant Examiner—Mark Sgantzos
Attorney, Agent, or Firm—Wells, St. John, Roberts, Gregory & Matkin

[57] ABSTRACT

An improved wind turbine 10 is described having a swivel head 18 mounted at an upper end of a support tower 12 for pivoting about a substantially vertical axis Y. A radial blade rotor assembly 48 is mounted to the swivel head 18 for pivotal movement about a substantially horizontal pivot axis X that is offset and spaced downwind of the vertical axis Y. The rotor assembly 48 has a rotor shaft 50 that rotates about a rotor axis Z that is spaced from the horizontal pivot axis X. The rotor assembly has a plurality of airfoil blades 64 that are attached to and extend radially outward from the rotor axis. The blades 64 rotate with a shallow inward conical path about the rotor axis Z in the blades 64 extending radially outward at an inclined angle from perpendicular of between 0 and 5 degrees. An electrical alternator 80 is connected to the rotor shaft 50 for generating electrical power directly from the rotor assembly 48.

20 Claims, 6 Drawing Sheets

FIG 6

WIND TURBINE

TECHNICAL FIELD

This invention relates to wind turbines and more particularly to wind turbines having radial rotor assemblies that are tiltable in response to the velocity of the wind.

BACKGROUND OF THE INVENTION

This invention represents significant improvements to the wind turbine generally shown and described in U.S. Pat. No. 4,449,889 granted May 22, 1984 to Ralph A. Belden.

The wind turbine described in the Belden patent represents a very significant step forward in the art of wind turbines to harness energy from wind having a wide range of velocities particularly at rather low velocities. It additionally has the ability to automatically adjust the effective rotor area to rapid changes in wind velocity and to automatically adjust the direction of rotor to changes in wind direction.

This invention provides improvements to make the wind turbine more responsive to rapid changes in wind velocity to obtain improved power efficiencies at lower wind velocities and to provide a more constant power output over a wider range of wind velocities. Additionally the present invention provides additional provisions for preventing the wind turbine from "overspeeding" even in high hurricane wind conditions. Further, the present invention is more responsive to rapid changes in wind direction to provide a more constant or even power output.

These and other advantages of the present invention will become apparent upon reading the following detailed description of a preferred embodiment.

BRIEF DESCRIPTION OF THE DRAWINGS

The preferred embodiment of the invention is illustrated in the accompanying drawings, in which.

DETAILED DESCRIPTION OF THE PREFERRED EMBODIMENTS

The following disclosure of the invention is submitted in furtherance with the constitutional purpose of the Patent Laws "to promote the progress of science and useful arts" (Article 1, Section 8).

Figure 1:
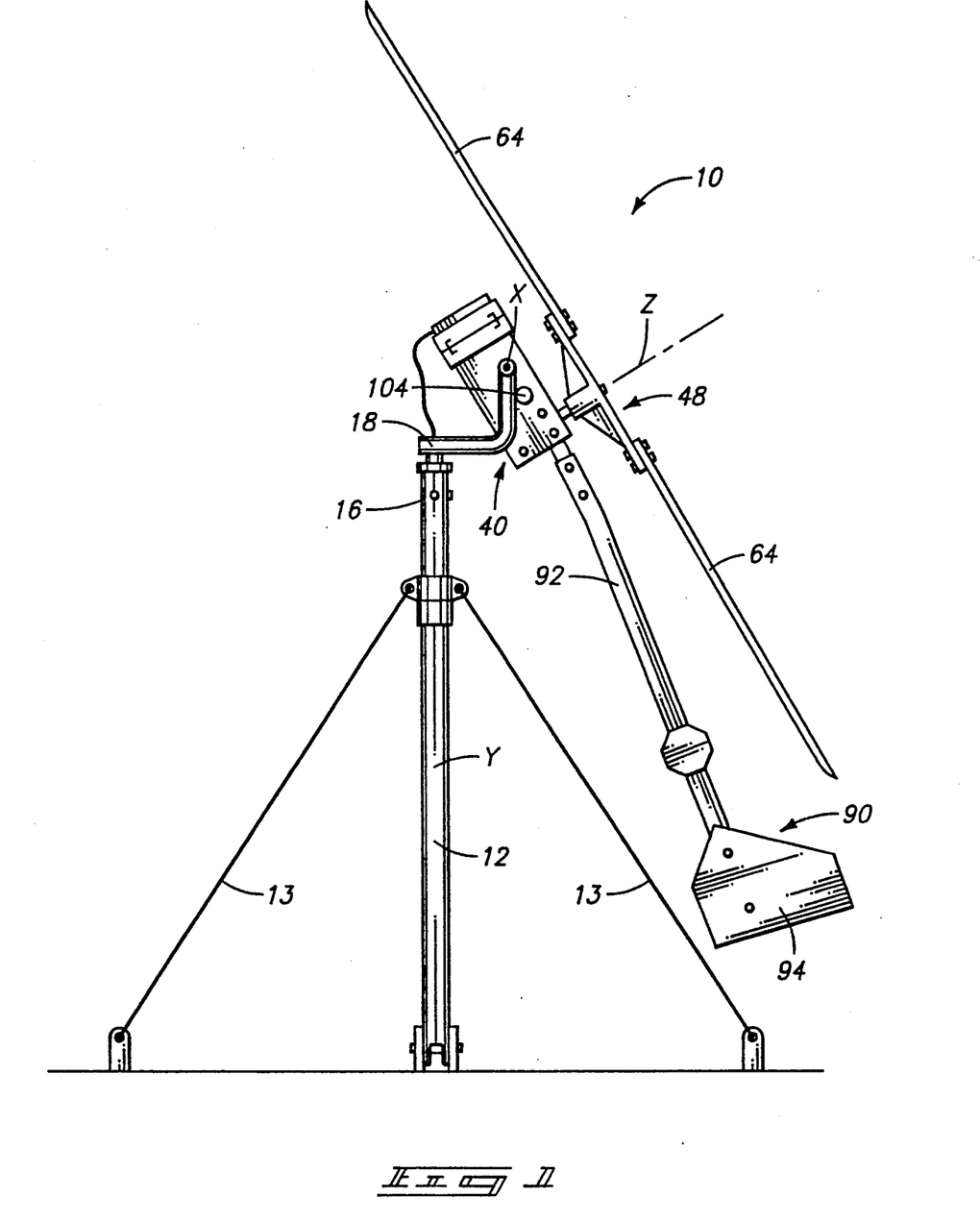
FIG. 1 is a side view of wind turbine showing the orientation of a rotor assembly tilted downward at a substantial inclined angle for operation at low velocity wind conditions.
Figure 2:
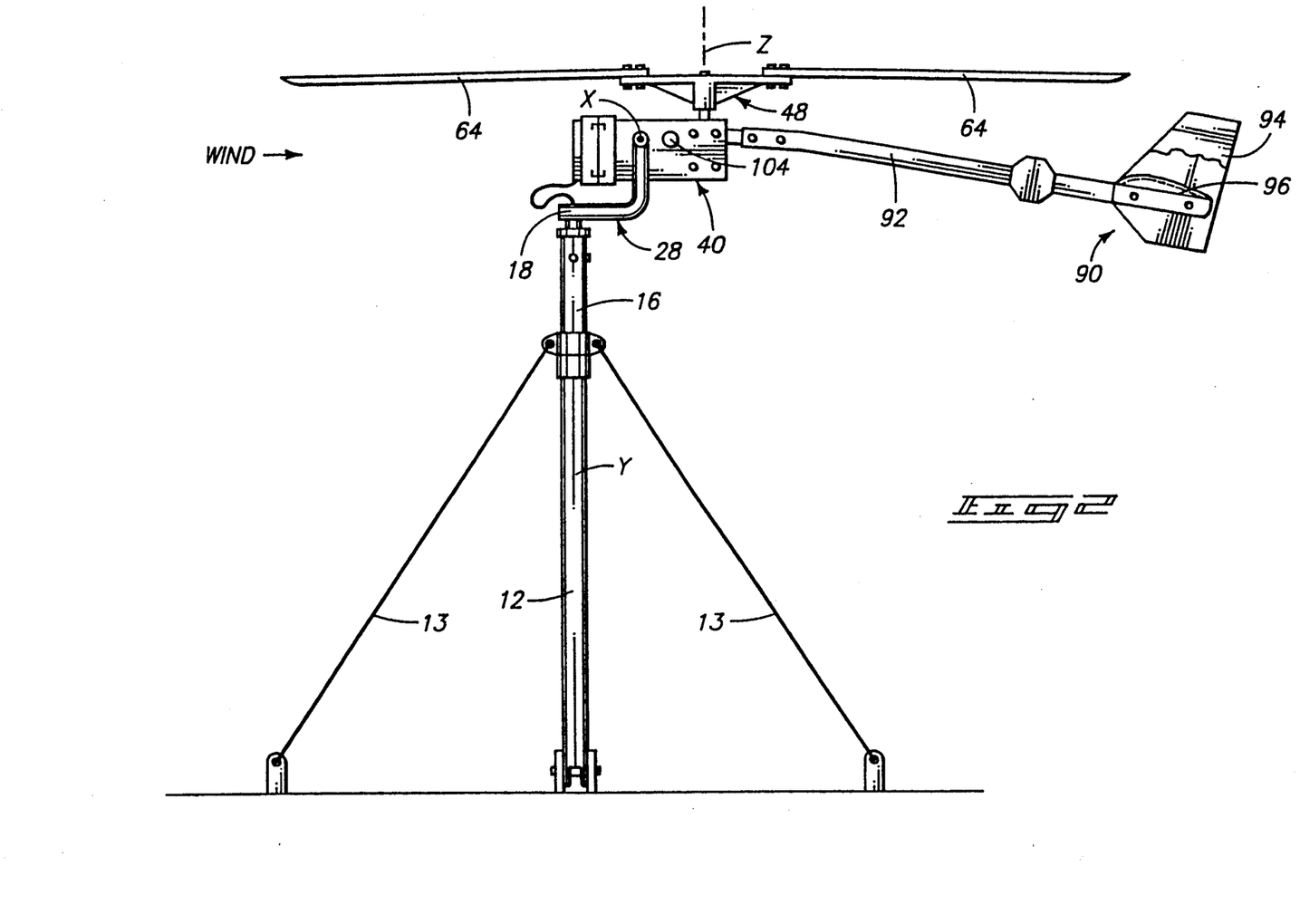
FIG. 2 is a side view of the wind turbine similar to FIG. 1 except showing the rotor assembly tilted upward at a more horizontal orientation for operation in high velocity wind conditions.

A preferred embodiment of the improved wind turbine, generally designated with the numeral 10, is illustrated in a low wind velocity or substantial tilt orientation in FIG. 1 and in a high wind velocity or insubstantial tilt orientation in FIG. 2.

The wind turbine 10 is generally mounted at a substantial elevation above ground level to place the turbine in the wind stream while minimizing wind distortions due to ground conditions and objects. Generally the wind turbine 10 is mounted on top of a upright support or tower 12 well above ground level. As shown guide wires 13 may be used to help support the tower to facilitate the use of a thin profile support that minimizes wind disturbance. The tower 12 extends to an upper end 16.

The turbine 10 includes a swivel head 18 mounted on the upper end 16. The swivel head has a swivel shaft assembly mounted on the upper end 16 for rotatably supporting a swivel shaft 24 that is rotatably about a substantially vertical axis Y. A swivel carriage 28 is mounted at an upper end 26 of the swivel shaft 24. The carriage 28 includes a cross support 30 (FIG. 3) and a set of spaced parallel arms 32 and 34. Each of the arms 32, 34 is "L" shaped with a right angle elbow between a horizontal section and a substantially vertical section. The arms 32, 34 support a tilt assembly 40 at its upper ends, in which the tilt assembly is tiltable about a substantially horizontal tilt or pivot axis X. It should be noted that the horizontal tilt axis X is offset horizontally a distance "A" downstream (with respect to the wind direction) from the substantially vertical axis Y. Additionally the tilt axis X is spaced a vertical distance "B" from the upper end 16 of the tower 12. The horizontal downstream offset of the horizontal tilt axis X with respect to the vertical swivel axis Y enables the wind turbine to be more responsive to rapid changes in wind direction to maintain the wind turbine facing into the wind at all times.

The tilt assembly 40 has a housing 42 with stub shafts 44 extending horizontally outward from both sides to receive the arms 32, 34 to define the horizontal tilt axis X.

The turbine 10 includes a rotor assembly 48 mounted on the tilt assembly 40 for vertical pivotal movement with the tilt assembly 40 between a substantial tilt orientation illustrated in FIG. 1 and an insubstantial tilt orientation illustrated in FIG. 2. The degree of tilt should be greater than 45 degrees and optimally approaching 80–90 degrees for maximum efficiency and range. The horizontal downstream offset of the pivot axis X facilitates the rotor assembly 48 pivoting to a substantially vertical orientation as illustrated in FIG. 1.

The rotor assembly 48 includes a rotor shaft 50 that is supported in bearings 52 for rotation about a rotor axis Z. It should be noted that the rotor axis Z is spaced a distance "C" from the horizontal tilt axis X. In one embodiment the rotor axis Z pivots about the tilt axis X in a plane containing the vertical axis Y. The bearings 52 are supported in an enclosed bearing and shaft case 54.

The rotor assembly 48 includes a radial rotor hub 58 mounted on the rotor shaft 50 for rotation with the shaft 50 about the shaft axis Z. The hub 58 has radial arms 62, preferably equally angularly spaced about the axis Z that extend radially outward. The rotor assembly 48 has radial blades or air foils 64 mounted to the hub arms 62 that extend radially outward to project into the path of the wind to extract kinetic energy from the wind and convert the kinetic energy to rotational torque on the rotor shaft 50 to produce usable power, preferably electrical power. Each of the blades 64 is attached to a respective radial arm 62 by detaching means 66. Alternatively, for rather small wind turbines, the blades may be formed integral with the hub 58.

Figure 3:
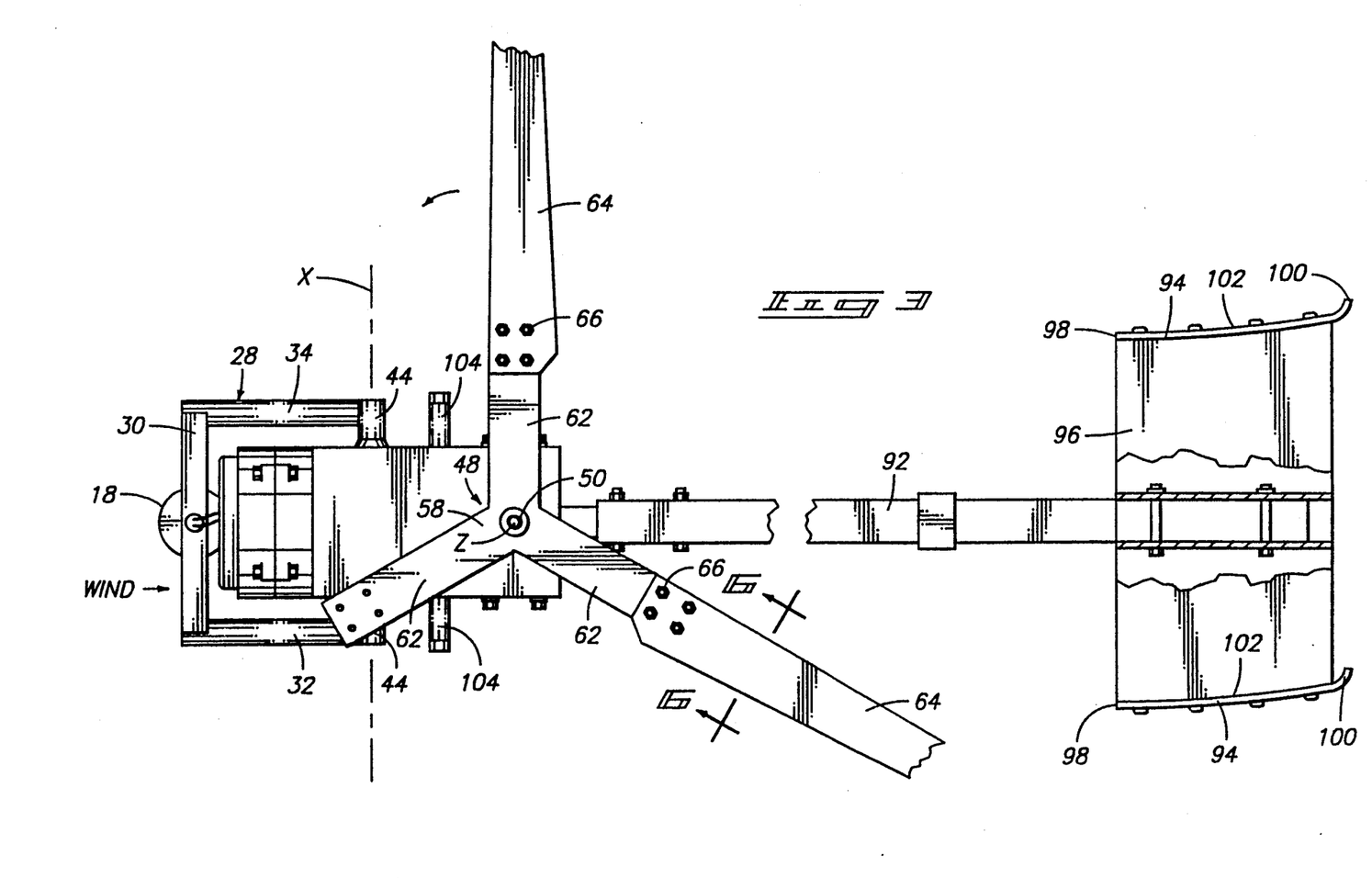
FIG. 3 is a fragmentary top view of the wind turbine illustrating rotor blades and the direction of rotation of the blades in relation to the wind direction sensed by a tail section.

Each of the blades 64, as illustrated in FIG. 8, has an airfoil cross-section with a leading edge 70, an upper airfoil surface 72, a lower airfoil surface 74 and a trailing edge 76. Each blade 64 is mounted to its respective hub arm 62 at a negative angle of attack $\beta$ to create a forward force vector to rotate the rotor shaft 50 in the forward direction of the leading edge 70 as illustrated in FIG. 3.

Each of the blades 64 are mounted to rotate about the rotor axis Z in a shallow conical path facing toward the horizontal tilt axis X, having an outer blade-to-blade angle $\alpha$ of greater than 180 degrees and preferably between 180 degrees and 185 degrees. Stated another way, the blades 64 rotate in an inward facing shallow conical path relative the rotor axis Z and relative to a plane perpendicular to the shaft axis Z that is greater than 0 degrees and preferably between 0 degrees and 5 degrees. Consequently if the rotor axis is vertical, the blades extend outward and downward at a slight inclined angle to maximize power conversion at low wind velocities and to minimize "overspeeding" at high wind velocities.

The wind turbine 10 further comprises a power conversion unit, preferably in the form of an electrical generator or alternator 80 that is operatively connected to the rotor shaft 50 to convert the torque of the rotor shaft to electrical power. Preferably the alternator 80 is part of the tilt assembly 40 and is directly connected to the rotor shaft 50. In this embodiment the alternator 80 is connected to the rotor shaft 50 through a right angle gear set 82 (FIG. 5) and a gear shaft coupling 86. It should be noted that the center of gravity of the alternator 80 is elevationally below and forward of the horizontal tilt axis X to provide a counter weight to the rotor assembly. The electrical output wires from the alternator 80 are connected to a conventional electrical commutator arrangement at the upper end of the tower 12 that is not shown. Such arrangement is shown in the Belden U.S. Pat. No. 4,449,889.

The wind turbine 10 includes an airfoil tail section 90 operatively connected to the tilt assembly 40 and the rotor assembly 48 to (1) assist in vertically pivoting the rotor assembly 48 about the horizontal tilt axis X, and (2) assist in horizontally pivoting the rotor assembly 48 about the vertical axis Y to maintain the rotor assembly facing into the wind as the direction of the wind changes.

Figure 4:
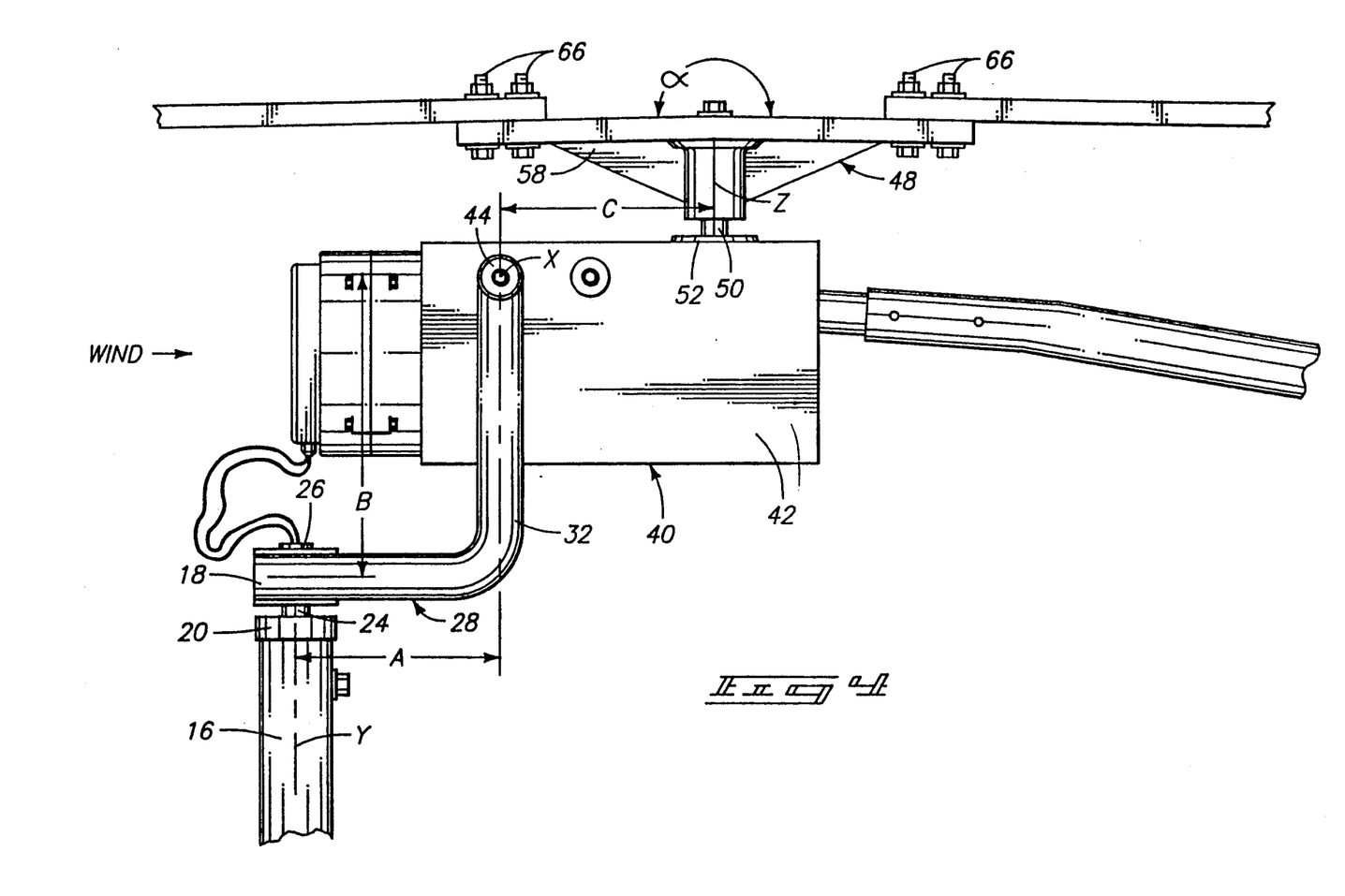
FIG. 4 is a fragmentary enlarged view of the rotor assembly illustrating angular and spacial relationships of various components.
Figure 5:
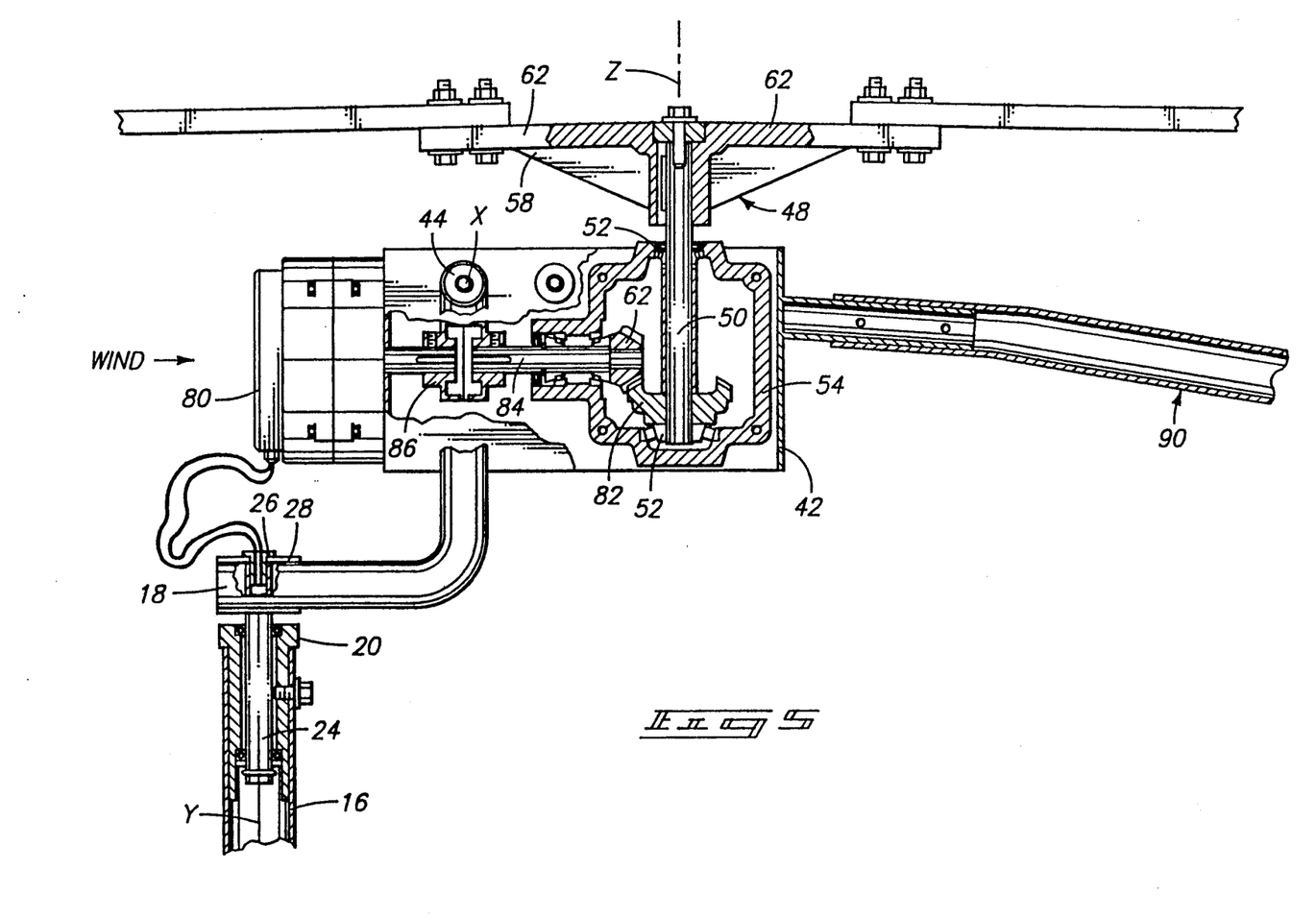
FIG. 5 is a fragmentary enlarged view similar to FIG. 4 except illustrating interior features of the rotor assembly.
Figure 6:
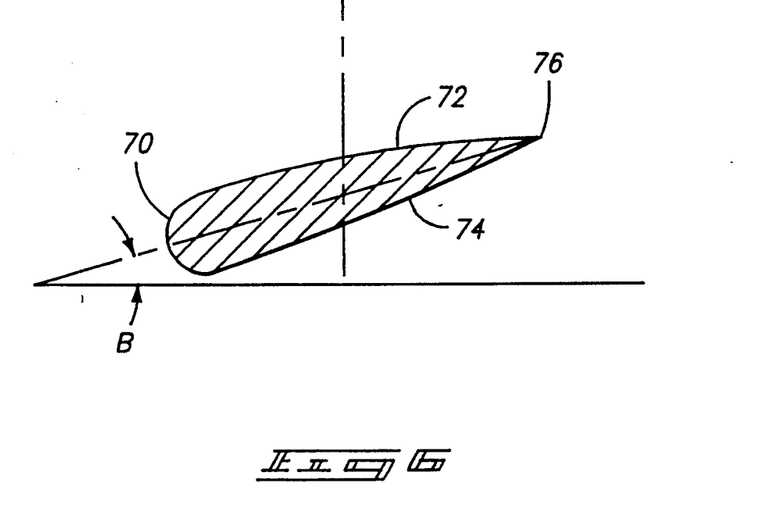
FIG. 6 is a vertical cross sectional view of one of the rotor blades taken along line 6—6 in FIG. 3 illustrating the negative angle of attack of the blade as it rotates.

The airfoil tail section 90 includes a frame 92 that is attached to the tilt assembly 40, as illustrated in FIGS. 3, 4 and 5, and extends radially outward from the rotor axis Z underneath the rotor blades 64 terminating radially outward of the blades 64. Various airfoils are provided that are projecting into the wind stream adjacent the terminal end of the tail section 90.

The tail section 90 includes upright vanes or airfoil elements 94 for assisting in maintaining the rotor assembly 48 facing into the wind and to rapidly pivot the rotor assembly 48 as the direction of the wind changes. Additionally the upright vanes 94 are curved to counter the gyroscopic torque exerted on the turbine as the blades 64 rotate about the rotor axis Z. Specifically each of the upright vanes 94 have a leading edge 98, a trailing edge 100 and a curved surface 102, as illustrated in FIG. 3. The tail section 90 further includes a substantial horizontal vane or airfoil element, referred to as elevator 96, that projects into the airstream to assist in tilting the rotor assembly 48 vertically about the horizontal tilt axis X. In low velocity winds the tail section 90, including the elevator 96, because of its weight biases the rotor assembly 48 vertically downward toward the substantial inclined orientation illustrated in FIG. 1. As the wind velocity increases, the elevator 96 generates a lifting force to bias the rotor assembly upward toward the insubstantial inclination illustrated in FIG. 2.

The tilt assembly 40 has pivot stop elements 104 mounted on the housing 42 that project outward to engage the arms 32 to limit the downward movement of the rotor assembly about the horizontal axis X to prevent the tail section 90 and the rotor assembly from engaging the tower 12 in very low wind conditions or in dramatically changing wind conditions.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

I claim:

1. A wind turbine for generating power in response to a wind, comprising:

a swivel head mounted to a wind turbine supporting structure for pivotal horizontal movement about an approximately vertical swivel axis;

a rotor assembly mounted to the swivel head for vertical tilting movement about an approximate horizontal axis between a substantial inclined downwind facing angle having maximum wind exposure for low wind velocities and an insubstantial inclined angle having minimum wind exposure for high wind velocities;

said rotor assembly having a rotor shaft mounted to the rotor assembly for rotation about a rotor shaft axis;

said rotor assembly having at least one radial rotor blade operatively connected to the rotor shaft and extending radially outward from the shaft defining a circular rotor area as the blade rotates about the shaft axis;

said circular rotor area being downwind of the vertical swivel axis when the rotor assembly is in the substantial inclined downwind facing angle;

an airfoil tail section operatively connected to and spaced downwind from the rotor shaft axis for projecting into the wind to swivel the rotor assembly about the approximate vertical axis in response to the direction of the wind to horizontally orient the rotor assembly into the wind;

said rotor blade having an airfoil cross section with a negative angle of attack with respect to a plane perpendicular to the rotor shaft axis for rotating the rotor shaft in a prescribed rotational direction about the rotor shaft axis;

wherein the rotor shaft axis is spaced downwind from the horizontal pivot axis of the rotor assembly to gravitationally bias the rotor assembly about the horizontal pivot axis from the insubstantial inclined angle toward the substantial inclined downwind facing angle to increase the effective rotor area relative to the wind as the wind velocities decrease.

2. The wind turbine as defined in claim 1 wherein the horizontal pivot axis is spaced downwind from the vertical swivel axis to facilitate horizontal swivel movement of the rotor assembly about the vertical swivel axis as the direction of the wind changes to maintain the rotor assembly into the wind.

3. The wind turbine as defined in claim 1 wherein the airfoil tail section includes an elevator airfoil for projecting into the wind to bias the rotor assembly about the horizontal tilt axis from the substantial inclined angle toward the insubstantial inclined angle to reduce the effective rotor area relative to the wind in response to increasing wind velocities.

4. The wind turbine as defined in claim 1 wherein the rotor blade is operatively connected to rotor shaft to rotate in a shallow conical path about the rotor axis facing the horizontal pivot axis to minimize overspeeding of the rotor assembly.

5. The wind turbine as defined in claim 1 further comprising a counterweight operatively connected to the rotor assembly upwind of the horizontal pivot axis to counter-balance the gravitational bias of the rotor assembly.

6. The wind turbine as defined in claim 1 further comprising an electrical generator operatively connected to the rotor shaft for generating electrical power as the rotor shaft is rotated.

7. The wind turbine as defined in claim 1 wherein the airfoil tail section has a substantially vertical vane projecting into the wind to automatically swivel the rotor assembly when the direction of the wind changes to maintain the rotor assembly facing the direction of the wind and a substantially horizontal vane projecting into the wind to automatically increase the effective rotor area relative to the wind when the wind velocity decreases and automatically decrease the effective rotor area relative to the wind when the wind velocity decreases.

8. A wind turbine for generating power in response to a wind, comprising:
   a swivel head mounted to a wind turbine supporting structure for pivotal horizontal movement about an approximately vertical swivel axis;
   a rotor assembly mounted to the swivel head for pivotal tilting movement about an approximate horizontal axis between a substantial inclined angle having maximum wind exposure for low wind velocities and an insubstantial inclined angle having minimum wind exposure for high wind velocities;
   said rotor assembly having a rotor shaft mounted to the rotor assembly for rotation about a rotor shaft axis;
   said circular rotor area being downward of the vertical swivel axis when the rotor assembly is in the substantial inclined angle;
   said rotor assembly having at least one radial rotor blade operatively connected to the rotor shaft and extending radially outward from the shaft defining a circular rotor area as the blade rotates about the shaft axis;
   an airfoil tail section operatively connected to and spaced downwind from the rotor shaft axis for projecting into the wind to pivot the rotor assembly about the approximate vertical swivel axis in response to the direction of the wind to horizontally orient the rotor assembly into the wind;
   said rotor blade having an airfoil cross section with a negative angle of attack with respect to a plane perpendicular to the rotor shaft axis for rotating the rotor shaft in a prescribed rotational direction about the rotor shaft axis;
   wherein the horizontal pivot axis is spaced downwind from the vertical swivel axis to facilitate horizontal swivel movement of the rotor assembly about the vertical swivel axis as the direction of the wind changes to maintain the rotor assembly into the wind.

9. The wind turbine as defined in claim 8 wherein the rotor shaft axis is spaced downwind from the horizontal pivot axis of the rotor assembly to gravitationally bias the rotor assembly about the horizontal pivot axis from the insubstantial inclined angle toward the substantial inclined angle to decrease the effective rotor area relative to the wind as the wind velocities decrease.

10. The wind turbine as defined in claim 8 wherein the airfoil tail section includes an elevator airfoil for projecting into the wind to bias the rotor assembly about the horizontal tilt axis from the substantial inclined angle toward the insubstantial inclined angle to reduce the effective rotor area relative to the wind in response to increased wind velocities.

11. The wind turbine as defined in claim 8 wherein the rotor blade is operatively connected to rotor shaft to rotate in a shallow conical path about the rotor axis facing the horizontal pivot axis to minimize overspeeding of the rotor assembly.

12. The wind turbine as defined in claim 8 further comprising a counterweight operatively connected to the rotor assembly upwind of the horizontal pivot axis to counter-balance the gravitational bias of the rotor assembly.

13. The wind turbine as defined in claim 8 further comprising an electrical generator operatively connected to the rotor shaft for generating electrical power as the rotor shaft is rotated.

14. The wind turbine as defined in claim 8 wherein the airfoil tail section has a substantially vertical vane projecting into the wind to automatically swivel the rotor assembly when the direction of the wind changes to maintain the rotor assembly facing the direction of the wind and a substantially horizontal vane projecting into the wind to automatically increase the effective rotor area relative to the wind when the wind velocity decreases and automatically decrease the effective rotor area relative to the wind when the wind velocity decreases.

15. A wind turbine for generating power in response to a wind, comprising:
   a swivel head mounted to a wind turbine supporting structure for pivotal horizontal movement about an approximately vertical swivel axis;
   a rotor assembly mounted to the swivel head for pivotal tilting movement about an approximate horizontal axis between a substantial inclined angle having maximum wind exposure for low wind velocities and an insubstantial inclined angle having minimum wind exposure for high wind velocities;

said rotor assembly having a rotor shaft mounted to the rotor assembly for rotation about a rotor shaft axis;

said rotor assembly having at least one radial rotor blade operatively connected to the rotor shaft and extending radially outward from the shaft defining a circular rotor area as the blade rotates about the shaft axis;

said circular rotor area being downwind of the vertical swivel axis when the assembly is in the substantial inclined angle;

an airfoil tail section operatively connected to and spaced downwind from the rotor shaft axis for projecting into the wind to pivot the rotor assembly about the approximate vertical swivel axis in response to the direction of the wind to horizontally orient the rotor assembly into the wind;

said rotor blade having an airfoil cross section with a negative angle of attack with respect to a plane perpendicular to the rotor shaft axis for rotating the rotor shaft in a prescribed rotational direction about the rotor shaft axis;

wherein the rotor blade is operatively connected to the rotor shaft to rotate in a shallow conical path about the rotor axis facing the horizontal pivot axis to minimize overspeeding of the rotor assembly.

16. The wind turbine as defined in claim 15 wherein the horizontal pivot axis is spaced downwind from the vertical swivel axis to facilitate horizontal swivel movement of the rotor assembly about the vertical swivel axis as the direction of the wind changes to maintain the rotor assembly into the wind.

17. The wind turbine as defined in claim 15 wherein the airfoil tail section includes an elevator airfoil for projecting into the wind to bias the rotor assembly about the horizontal tilt axis from the substantial inclined angle toward the insubstantial inclined angle to reduce the effective rotor area relative to the wind in response to increased wind velocities.

18. The wind turbine as defined in claim 15 wherein the rotor shaft axis is spaced downwind from the horizontal pivot axis of the rotor assembly to gravitationally bias the rotor assembly about the horizontal pivot axis from the insubstantial inclined angle toward the substantial inclined angle to increase the effective rotor area relative to the wind as the wind velocities decrease.

19. The wind turbine as defined in claim 15 further comprising a counterweight operatively connected to the rotor assembly upwind of the horizontal pivot axis to counter-balance the gravitational bias of the rotor assembly.

20. The wind turbine as defined in claim 15 further comprising an electrical generator operatively connected to the rotor shaft for generating electrical power as the rotor shaft is rotated.

* * * * *

UNITED STATES PATENT AND TRADEMARK OFFICE
CERTIFICATE OF CORRECTION

PATENT NO. : 5,295,793
DATED : March 22, 1994
INVENTOR(S) : Belden

It is certified that error appears in the above-identified patent and that said Letters Patent is hereby corrected as shown below:

<u>Title page,</u>
Item [73], Assignee, delete "Telect, Inc., Liberty Lake, Wash.", and replace with
-- Classic Profit Limited, Hong Kong --.

Signed and Sealed this

Twenty-third Day of September, 2003

JAMES E. ROGAN
*Director of the United States Patent and Trademark Office*